(12) United States Patent
Glienicke

(10) Patent No.: US 6,356,394 B1
(45) Date of Patent: Mar. 12, 2002

(54) MUSHROOM-SHAPED LIGHT GUIDE

(75) Inventor: Haiko Glienicke, Salz (DE)

(73) Assignee: Preh- Werke GmbH & Co. KG, Bad Neustadt/Saale (DE)

( * ) Notice: Subject to any disclaimer, the term of this patent is extended or adjusted under 35 U.S.C. 154(b) by 29 days.

(21) Appl. No.: 09/659,591

(22) Filed: Sep. 11, 2000

(30) Foreign Application Priority Data

Sep. 11, 1999 (DE) .......................................... 199 43 589

(51) Int. Cl.⁷ .......................... G02B 27/30; G01D 11/28; F21V 9/00
(52) U.S. Cl. ........................... 359/641; 362/26; 362/511
(58) Field of Search ................................. 359/641–642, 359/718, 720, 726, 796, 833, 837; 362/23, 26, 31, 551, 555, 509, 511, 520

(56) References Cited

U.S. PATENT DOCUMENTS 5,343,330 A  *  8/1994  Hoffman et al. ............. 359/708
5,934,782 A  *  8/1999  Atkins et al. ................. 362/26
6,276,809 B1 *  8/2001  Matsumoto .................. 362/26

\* cited by examiner

*Primary Examiner*—Jordan M. Schwartz

(57) ABSTRACT

Disclosed is a Mushroom-shaped light guide for a homogeneous illumination of a circular scale of a motor vehicle operating device by means of a light source (LED) arranged opposite a light input surface of a mushroom-shaped cone, wherein a light input surface has a cylindrical recess, and edge of which is rounded off in a circle with a radius R between a lateral surface and an axial surface, and a base of which is provided in a form of a ball surface which projects centrally, whereby the mushroom-shaped cone has a conical end section. This produces an increased parallel alignment of the light beams, which effects an improved illumination of the dial.

2 Claims, 1 Drawing Sheet

MUSHROOM-SHAPED LIGHT GUIDE

BACKGROUND OF THE DISCLOSURE

This application claims priority based upon German patent document 199 43 589.8, the content of which are incorporated herein by reference.

1. Field of the Invention

The invention relates to light guides, and in particular, mushroom-shaped light guides.

2. Related Art

A mushroom-shaped light guide is used e.g. in a preset potentiometer of DE 197 12 294, whereby the light guide is connected to a control knob and has a light incidence surface in the rotational center. In front of the latter, a light source is arranged. The light guide's body ends with its circumferential part in a transparent case that has a scale, which can be seen externally.

However, it has been found that the invention of the related art provides insufficient illumination.

SUMMARY OF THE INVENTION

Therefore, an object of the present invention is to provide a mushroom-shaped light guide with improved illumination.

This object and other objects of the present invention are achieved by providing a Mushroom-shaped light guide for a homogeneous illumination of a circular scale of a motor vehicle operating device by means of a light source (LED) arranged opposite a light input surface of a mushroom-shaped cone, wherein a light input surface has a cylindrical recess, and edge of which is rounded off in a circle with a radius R between a lateral surface and an axial surface, and a base of which is provided in a form of a ball surface which projects centrally, whereby the mushroom-shaped cone has a conical end section.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERED EMBODIMENTS

Figure 1:
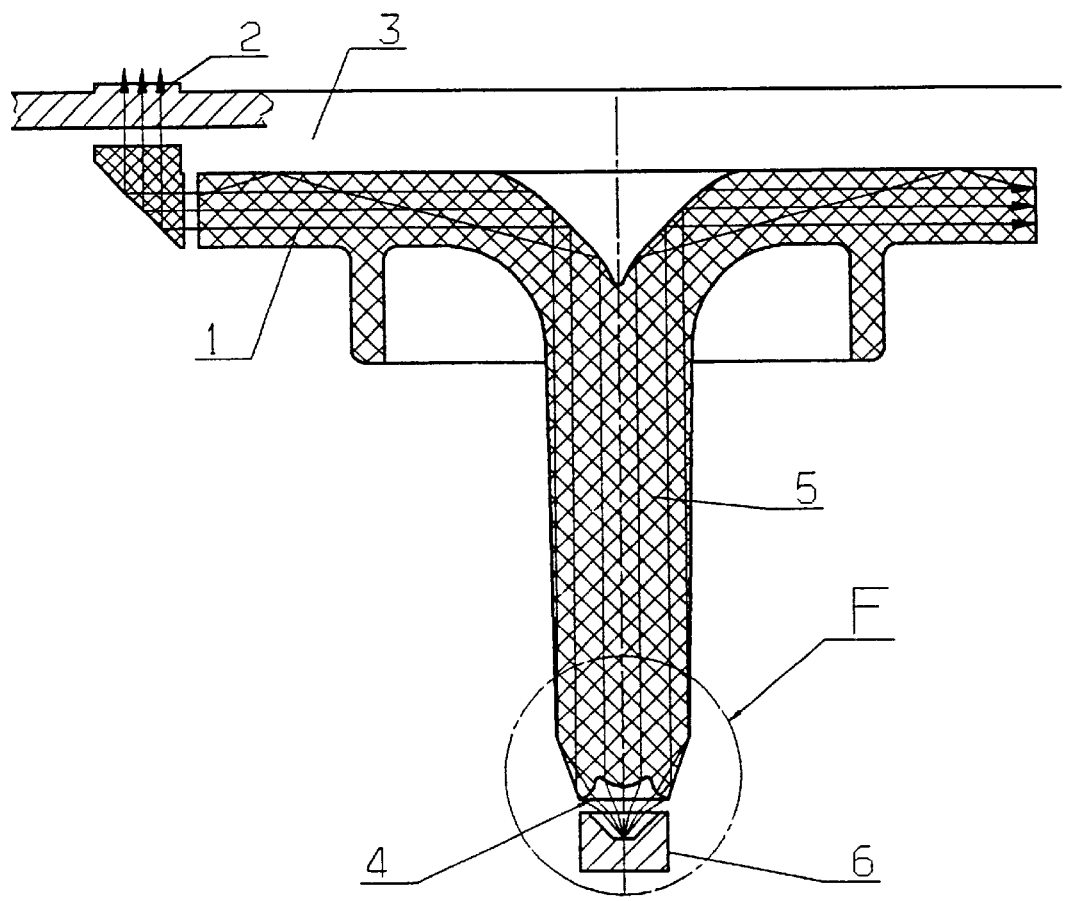
FIG. 1 is a cross-sectional view of a mushroom-shaped light guide according to the present invention.
Figure 2:
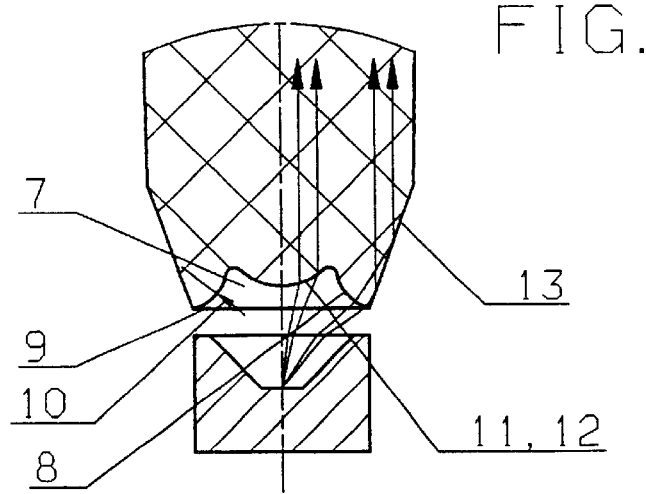
FIG. 2 is an exploded view of indicator F illustrated in FIG. 1.

FIG. 1 illustrates a mushroom-shaped light guide 1 for homogenous illumination of a circular dial 2 of a motor vehicle operating device 3 by a light source 6 (LED) arranged opposite a light input surface 4 of a mushroom shaped cone 5.

With the mushroom-shaped light guide 1 according to the present invention it is then provided that the light input surface 4 that has a cylindrical recess 7, the edge of which is rounded off as circular with a radius R 10 between the lateral surface and the axial surface 8 and 9, and the base 11 of which is provided in the form of a ball surface, i.e. forming a universal ball joint 12 that projects centrally, whereby the mushroom-shaped cone 5 has a conical end section 13. If the radius 10, the size of the universal ball joint 12 and the cone of the end section 13 cannot be determined by the design, they will be optimized empirically.

Advantageously, the light source 6 is an LED with a wide radiation angle. The shape of the light input surface 4 in accordance with the present invention creates a parallel alignment of light beams (arrows) in the mushroom-shaped light guide 1 such that the light deviation and the luminous efficiency is essentially increased as compared to the known mushroom-shaped light guide in such a way that an improved illumination of the dial 2 is achieved.

It is also within the scope of the present invention that the light input surface 4 may also be assembled of several segments (not depicted), the surfaces of which can be provided straight or rounded-off and will form a circle. In other words, the segments can also be of complex shape and may form a circle from a multitude of forms.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A Mushroom-shaped light guide for a homogeneous illumination of a circular scale of a motor vehicle operating device by means of a light source (LED) arranged opposite a light input surface of a mushroom-shaped cone (5), wherein a light input surface (4) has a cylindrical recess (7), an edge of which is rounded off in a circle with a radius R (10) between a lateral surface and an axial surface (8 and 9), and a base (11) of which is provided in a form of a ball surface which projects centrally, whereby the mushroom-shaped cone (5) has a conical end section (13).

2. The mushroom-shaped light guide according to claim 1, wherein the light input surface is formed by a multitude of segments with a complex shape.

* * * * *